United States Patent [19]

Welborn

[11] 4,155,408
[45] May 22, 1979

[54] ENGINE DRIVEN GARDEN PLOW FOR BREAKING UP SOIL WITH LEVERS FOR ADJUSTING PLOW THEREOF

[76] Inventor: Woodrow W. Welborn, Rte. 9, Box 375, Laurel, Miss. 39440

[21] Appl. No.: 839,690

[22] Filed: Oct. 5, 1977

[51] Int. Cl.² .......................................... A01B 59/044
[52] U.S. Cl. ..................................... 172/257; 172/260; 172/611
[58] Field of Search ............... 172/256, 257, 258, 259, 172/260, 297, 298, 304, 305, 306, 307, 308, 309, 310, 611, 23

[56] References Cited

U.S. PATENT DOCUMENTS

| D. 148,040 | 12/1947 | Steel | 172/256 UX |
|---|---|---|---|
| 964,179 | 7/1910 | Opsata | 172/297 |
| 1,378,196 | 5/1921 | Plettner et al. | 172/297 |
| 1,601,797 | 10/1926 | Hansmann et al. | 172/256 |
| 3,661,212 | 5/1972 | Johnson | 172/258 |

FOREIGN PATENT DOCUMENTS

| 841964 | 6/1952 | Fed. Rep. of Germany | 172/611 |
|---|---|---|---|
| 1036554 | 8/1958 | Fed. Rep. of Germany | 172/33 |
| 536598 | 2/1922 | France | 172/257 |
| 724425 | 10/1930 | France | 172/258 |
| 893786 | 10/1944 | France | 172/257 |
| 1309183 | 10/1962 | France | 172/257 |
| 481787 | 1/1970 | Switzerland | 172/306 |

*Primary Examiner*—Richard T. Stouffer
*Attorney, Agent, or Firm*—Misegades, Douglas & Levy

[57] ABSTRACT

Apparatus of a dual wheel, engine driven garden plow for breaking up soil, then distributing the soil in rows and plowing out between the rows during the growth of a crop. Such apparatus includes an engine powered tractor, dual wheel front frame construction and a counter weight stabilizer bar in the rear for permitting riding of the apparatus. A lever system provides the adjustment structure for the plow itself.

1 Claim, 3 Drawing Figures

ENGINE DRIVEN GARDEN PLOW FOR BREAKING UP SOIL WITH LEVERS FOR ADJUSTING PLOW THEREOF

CROSS-REFERENCE TO RELATED APPLICATIONS

This application is related to an application no. P-47,396 filed in the Security Group on Apr. 29, 1977 and issued a License No. 400,953 on Apr. 29, 1977 on file on behalf of the above applicant.

BRIEF SUMMARY OF THE INVENTION

The present invention is an improvement apparatus for breaking up soil, laying the soil in rows, and for plowing out between the rows during growth of a crop, and more particularly relates to an improved garden plow having an L-shaped frame member disposed generally horizontally and having a seat mounted near the apex portion of the L-shaped frame, a pair of wheel supporting structures for the rear wheels supported from and under one arm of the L-shaped frame, an engine carriage means pivotally mounted to an end of the other arm of the L-shaped frame and including a front-dual element wheel, and a plow element structure means adjustably mounted beneath an intermediate portion of said other arm of the L-shaped member positioned for engaging the ground.

BACKGROUND OF THE INVENTION

An object and advantage of the present invention is to provide an improved garden plow having adjustments for an engine in the engine carriage means, for the adjustment of the blade of the plow, for controls and levers on a handle bar mounted from the engine carriage for providing means to adjust, regulate, control and manipulate the adjusting capabilities of the mounted plow means, and for mounting structures to facilitate lever adjustability for extending downwardly the plow means.

A further object of the present invention is to provide an easily manipulatable garden tractor that does not feel as though it is being wrestled away from the operator.

A further object of the present invention is to provide a plow that provides a breakthrough in garden cultivation in that it is constructed of a main frame of solid steel, has a dual-pulling wheel in the front portion thereof and which is provided with two rear wheels smaller in size and are of rubber so spread apart that there is assistance in taking some of the bumps and the control for guiding the tractor through the soil. The dual front wheel permits one to stay on top of the seed bed or on a small ridge, and provides ease in steering from handlebars that are mounted on the engine carriage as it is pivotally mounted from an L-shaped member. By these means and objectives of the invention, the new garden tractor provides ease in steerage, plowing, and adjustability in applying the plow to the soil in any relative direction to the soil as is desired.

A further and general object of the present invention is to provide an improved garden plow used for breaking up the soil, laying off rows with ease, and cultivating a crop during his period of growth without rolling or driving over the crop in progress.

BRIEF DESCRIPTION OF THE SEVERAL VIEWS OF THE DRAWINGS

The above and other objects and advantages of the invention will become apparent upon full consideration of the following detailed description and accompanying drawings in which.

DETAILED DESCRIPTION OF THE PRESENT INVENTION AND THE BEST MODE THEREOF

Figure 1:
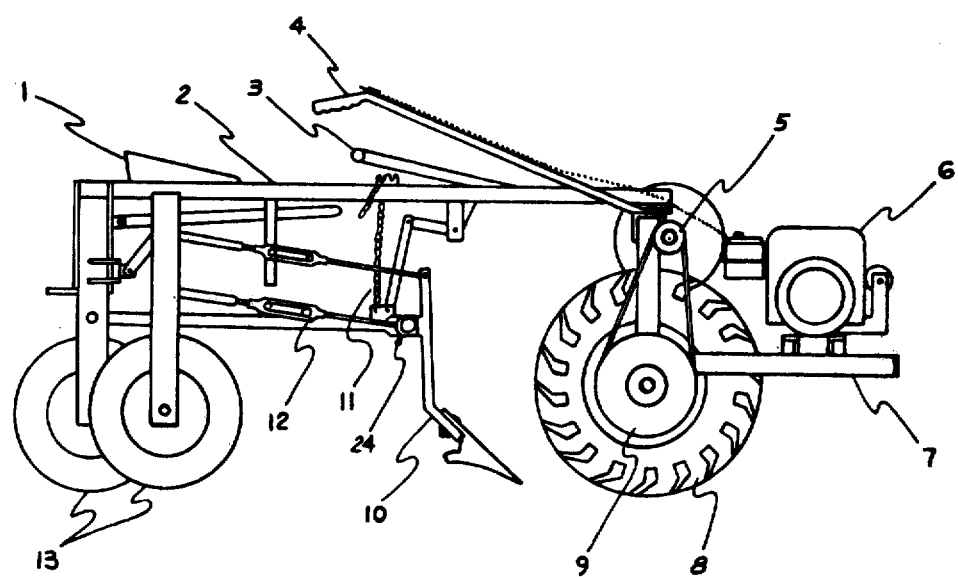
FIG. 1 is a right side view of a garden plow according to a preferred embodiment of the invention.
Figure 2:
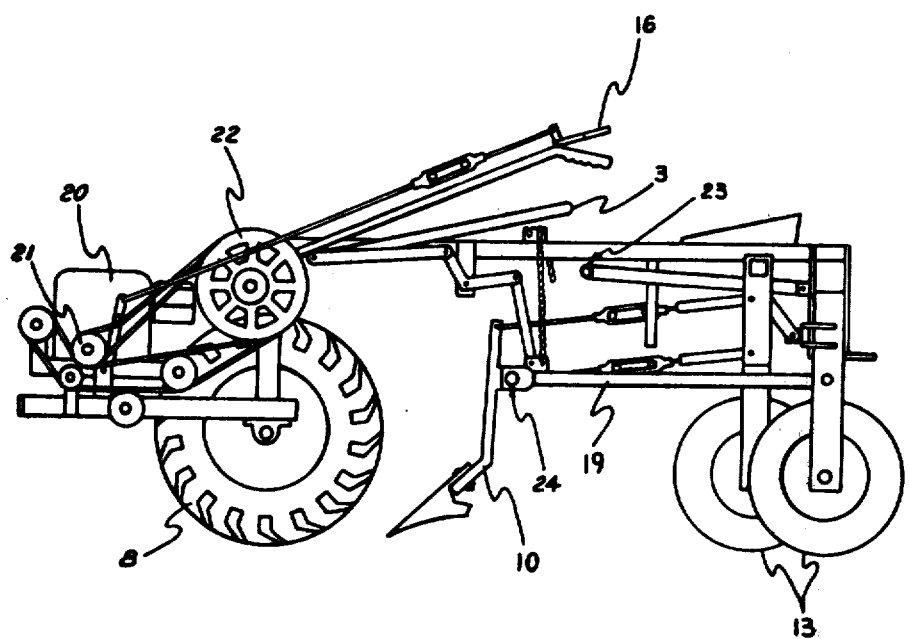
FIG. 2 is a left side view thereof.
Figure 3:
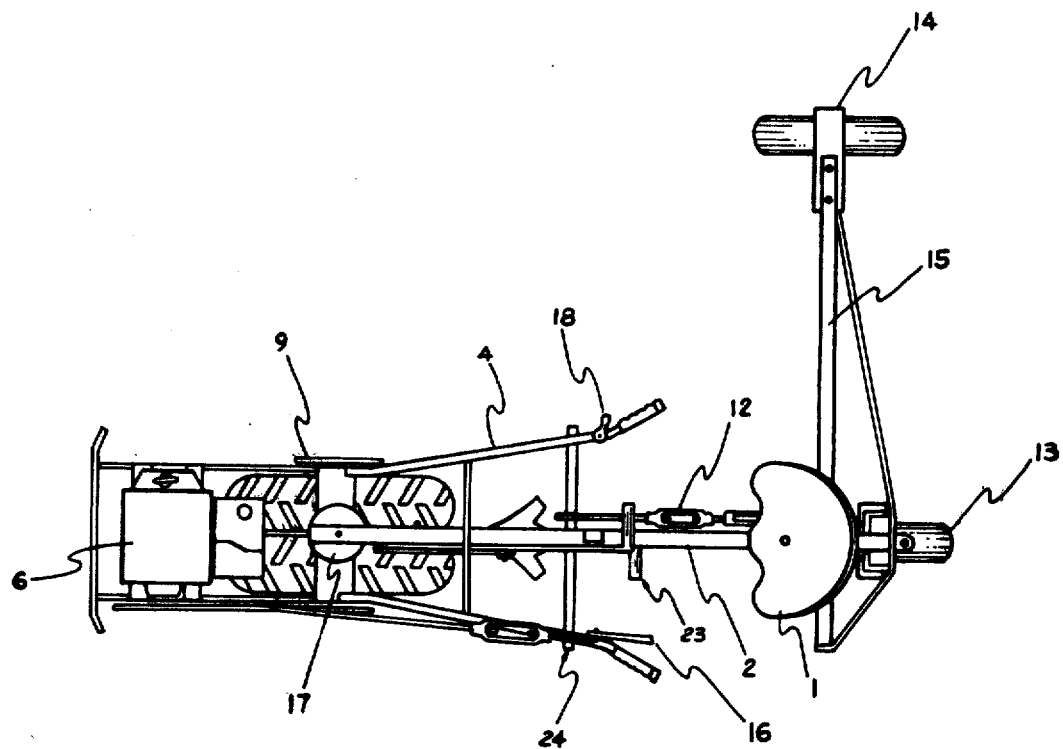
FIG. 3 is a top view thereof.

Referring now to the drawing there is shown an improved garden plow having an operator's seat 1 mounted upon a basic, L-shaped frame 2, a lever 3 coupled to a plow structure or plow foot 10, handlebars 4, 4 for guiding the carriage frame or drive frame 7 on which is mounted an internal combustion type engine 6.

The drive frame 7 as shown in FIG. 1 has mounted on it the dual wheel drive 8, a sprocket 9 connected to sprocket 5 which is driven by the internal combustion engine by the drive pulley 22, the engine pulley 21 and the associated belts, as shown.

The L-shaped frame 2, 15 includes stabilizer bar 15 from which are mounted rear wheels 13, 13 and a counter weight 14, and at the other end of the L-shaped member 2 is a pivotal connection or pivot point 17 that connects with the engine frame, carriage or drive frame 7, as shown.

On the handlebar 4 there is mounted an accelerator lever or accelerator device 18 on the one hand and on the other handlebar there is mounted a lever 16 to provide means to engage and disengage the engine 6 from the dual drive wheel 8 through an arrangement of pulleys. When the lever 16 is engaged the V belt is tightened on the engine pulley 21 and the drive pulley 22. The drive pulley 22 is mounted on the same shaft as the drive sprockets 5 and 9 as described above. The speed in which the engine travels and propels the garden plow is controlled by the accelerator device 18 as described above. The depth to which the plow foot 10 can be lowered into place and adjusted is by a lever 23 and a lever 3. The depth controlled is by a chain 11, as shown. The pitch of the plow can be adjusted and set with adjusting rods 12. A tool bar 24 provides spacing of the handlebars 4, 4 from each other. The dual front wheels 8 provide traction as shown by the tread for plowing with ease between rows, on top of seed beds, and on the side of the seed bed itself. By means of the arrangement of the wheels and the L-shaped frame taken together with the counter weight 14 there is provided a dual wheel engine driven garden plow steered from a pivot point allowing rear wheel control for stabilizing the plow and for allowing the plow to always follow a designated and determined path of the tractor.

By means of the structure of the invention, height adjustment of the center rear wheel 13, that is the one beneath the seat of the operator allows leveling of the device when on top of a seed bed and in deep and shallow furrows.

By means of the invention ease in raising and lowering the plow to adjustable depths is available while driving and operating the tractor. The plow pitch is set and adjusted which can be easily changed at the end of each row, or otherwise, as needed.

A stabilizer counter weight and wheel 13 at the end of the L-shaped frame gives the advantages of a single wheel tractor, but by structure of the present invention the tractor can be ridden by the operator.

It is seen by means of the present invention that a family type garden plow having a single front wheel type apparatus with an engine for driving it and availing of forward motion with two stabilizing rear wheels provide a physically held upright improved garden plow and allowing the operator to guide the tractor while he is riding it in seat 1. The garden plow of the present invention does not require that it be held upright, be guided by an operator while walking behind the machine, nor does it require strenuous condition and exertion of an operator of controlling and guiding the plow.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. An improved garden plow for breaking up the soil, laying the soil in rows and for plowing out between the rows during growth of a crop comprising a generally horizontally disposed L-shaped frame wherein said frame comprises two horizontally disposed arms connected at substantially a right angle to each other, said frame having a seat mounted near the apex portion of said L-shaped frame, a wheel supporting structure including a pair of wheels, each of which is dependedly mounted under an opposite end of one of said arms of the horizontally disposed L-shaped frame from the other of the pair of wheels, one said opposite end being joined to one end of the other of said arms, said wheels providing rear wheels for said plow, an engine carriage means including an engine mounted thereon for driving a component of said plow, said engine carriage means pivotally mounted and connected to the other end of said other arm of the horizontally disposed L-shaped frame and including a front dual element wheel mounted thereto beneath the pivotally mounted connection of said carriage means, handle levers and engine control means provided on handlebars mounted from the engine carriage means, a tool bar spatially separating the handlebars, a plow means secured to said tool bar and adjustably mounted beneath the intermediate portion of said other arm of the horizontally disposed L-shaped frame positioned for selectively engaging the ground, levers means including one lever bar pivotally connected to and extending between the plow means and said wheel supporting structure and extending from the apex of the horizontally disposed L-shaped frame, and a second lever bar connected to said first lever bar by a crank arm and positioned forwardly of said seat to act as an operator control means for said plow means to adjust, regulate, control and manipulate the adjustably mounted plow means for selectively engaging the ground, and a counter weight being mounted at the free end of said one arm of the horizontally disposed L-shaped frame.

* * * * *